Jan. 4, 1949.

H. C. DONER 2,457,877

COOKING UNIT

Filed Nov. 23, 1942

Inventor
HALBERT CRESTON DONER.
By
Frank Fraser
Attorney

Jan. 4, 1949.                H. C. DONER                 2,457,877
                              COOKING UNIT
Filed Nov. 23, 1942                              2 Sheets-Sheet 2

Inventor
HALBERT CRESTON DONER.
By Frank Fraser
           Attorney

Patented Jan. 4, 1949

2,457,877

UNITED STATES PATENT OFFICE 2,457,877

COOKING UNIT

Halbert Creston Doner, Toledo, Ohio, assignor to Libbey-Owens-Ford Glass Company, Toledo, Ohio, a corporation of Ohio Application November 23, 1942, Serial No. 466,582

3 Claims. (Cl. 219—35)

The present invention relates broadly to cooking units and more particularly to improvements in cooking stoves or ranges for domestic use.

An object of the invention is to provide a cooking stove of this type having a total area relatively less than that in the present standard stoves, which is highly efficient in operation, exceptionally convenient to use, sanitary and economical.

Another object of the invention is to provide a cooking stove so constructed that it may be mounted upon a wall and adjusted vertically to a height most comfortable for the housewife and in which all of the operating parts are so arranged as to minimize stooping or other tiring efforts by the housewife during the cooking processes.

Another object of the invention is to provide a cooking stove in which the cooking vessels are "built-in" and constitute a part of the cooking unit thereby eliminating the use of separate pots and pans upon the top of the stove.

A further object of the invention is to provide a cooking stove in which the cooking vessels are removably received in recesses formed in the top thereof, whereby a greater percentage of the heat from the heating elements is utilized and in which a minimum of heat is required for the cooking processes.

A still further object of the invention is to provide a cooking stove embodying cooking vessels designed as square or rectangular units with round corners built into the stove and interchangeable with other vessels to permit the carrying out of both cooking and baking operations.

Other objects and advantages of the invention will become more apparent during the course of the following description, when taken in connection with the accompanying drawings.

In the drawings, wherein like numerals are employed to designate like parts throughout the same:

Fig. 3 is a transverse section through the cooking stove taken substantially on line 3—3 of Fig. 2;

Fig. 7 is a transverse section of one of the cooking units showing a baking vessel substituted for the cooking vessel;

Fig. 8 is a transverse section through the baking vessel; and

Figure 1:
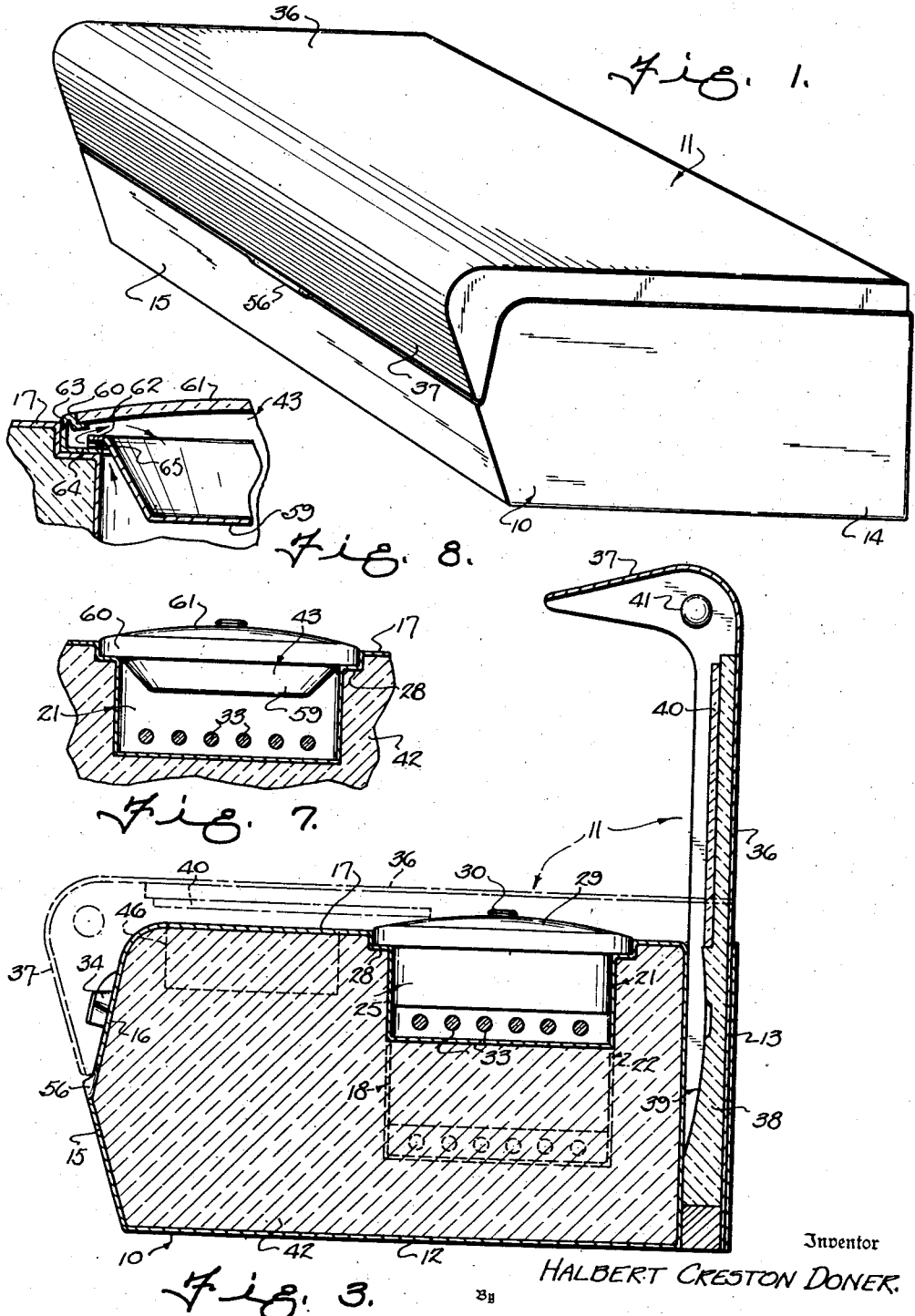
Fig. 1 is a perspective view of a cooking stove constructed in accordance with the invention and showing the cover thereof in closed position.

With reference to the drawings, and particularly to Fig. 1, it will be seen that the stove herein provided is substantially rectangular and comprises in general a housing 10 provided with a cover 11. When the cover is in closed position as shown, it completely covers the top of the housing and conceals the cooking vessels, heating elements, controls, etc., which are built into the housing as will be hereinafter described. Therefore, when the stove is not in use, the upper surface of the cover can be used as a shelf, a work counter, or for any other desired purpose.

The housing 10 is preferably of metal and comprises a bottom wall 12, back wall 13 and opposite end walls 14. The front wall of the housing comprises an upwardly and forwardly inclined lower portion 15 and an upwardly and rearwardly inclined upper portion 16 merging into a substantially horizontal top wall 17. The top wall 17 is provided along the back of the housing with a plurality of aligned recessed portions 18, 19, 20 and 21 adapted to removably receive therein the cooking vessels 22, 23, 24 and 25 respectively.

Although not essential, it is preferred that the cooking vessels be made square or rectangular with rounded corners and that the recessed portions within which the cooking vessels fit be correspondingly shaped. When the cooking vessels are placed in the recesses, they are adapted to be supported by the top wall 17 of the housing in such a way that they may be readily removed. Thus, each cooking vessel is herein provided at its upper end with a rim 26 having a base portion 27 adapted to rest upon a depressed flange 28 surrounding the respective recessed portion when the cooking vessel is lowered into its recess. With such a construction, the cooking vessels may be readily removed from the stove, when desired, for filling, serving of foods, or cleaning.

Figure 4:
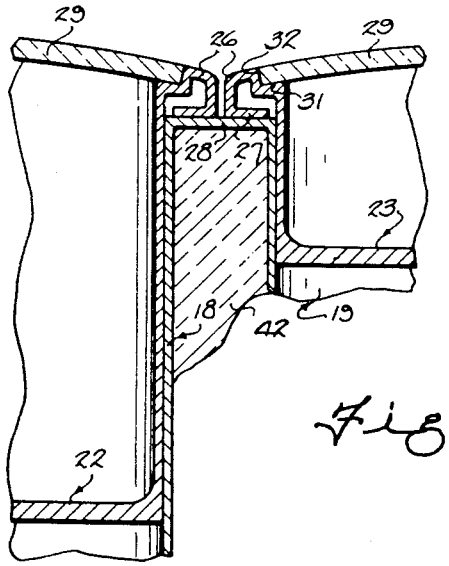
Fig. 4 is a detail section through the cooking vessels taken substantially on line 4—4 of Fig. 2.

Each cooking vessel is also provided with a cover 29 preferably consisting of a plate of tempered glass which may be either flat or bent; said cover plate being provided with any suitable type handle 30. The glass cover plate 29 is supported upon the rim 26 of the cooking vessel and for this purpose the said rim may be formed, as shown in Fig. 4, with a substantially horizontal ledge 31 upon which the cover plate rests and with a substantially vertical shoulder 32 for holding it against accidental displacement.

Although the invention is not limited to the use of cooking vessels of any particular size and/or capacity, it is suggested that the vessels 23, 24 and 25 have a common depth, serving as a 2-quart, 1½-quart and 1-quart vessel respectively, while the vessel 22 be relatively deeper to serve as a deep-well cooker.

Associated with each recessed portion 18, 19, 20 and 21 is a heating element 33 for heating the respective cooking vessel. The heating element 33 is mounted in the bottom of the recessed portion and, while it is preferred that an electrical heating element be used, gas or oil may be employed as the heating medium.

The electric heating elements 33 can be regulated by suitable type controls 34 as presently employed on electric stoves, and it is not thought necessary that the various types of control be referred to in detail. As shown in Fig. 3, the controls 34 are mounted upon the upper portion 16 of the front wall of the housing so that when the cover 11 of the stove is closed, as indicated in broken lines, it will not only cover and conceal the cooking vessels but also the electric controls. This is an added safety factor in that it will eliminate the danger of children playing with the controls while the housewife may be absent from the room. The stove may also be provided with an electric clock 35 connected in circuit with the controls 34 so that the operation of the stove may be rendered automatic.

The cover 11 consists of a flat plate 36 preferably of metal and which, when in closed position as shown in Fig. 1, completely covers the top of the housing. The forward portion 37 of plate 36 is shaped to fit over the upper portion 16 of the front wall of the housing and to form a continuation of the lower portion 15 thereof. When the cover is in open position, it is vertically disposed at the back of the stove and is held in place by sliding the rear end portion of the cover downwardly inside the back wall 13 of the housing (Fig. 3).

Secured to the inner surface of the cover 11 is a sheet or layer of suitable insulating material 38 and, when the said cover is in closed position, this insulation fits over the cooking vessels so that each vessel will, in effect, be converted into a fireless cooker. With such an arrangement, only a minimum of heat will be required for cooking. If desired, the insulation 38 may be cut away or shaped as at 39 to conform to the covers 29 of the cooking vessels.

Also carried upon the under side of the cover 11 is a panel 40 preferably consisting of a sheet or plate of translucent or opaque structural glass, such as Vitrolite, and which serves as a splash panel for sanitation in cooking when the cover is open as in Fig. 3. The cover 11 may be further provided with an electric lamp 41 which will illuminate the entire top of the stove when the cover is open. The housing 10 is also preferably filled with a suitable insulating material 42 to minimize radiation of heat therefrom and thus render the area around the stove more comfortable during the cooking operations.

If desired, the stove can also be utilized for minor baking operation by removing any one of the cooking vessels and inserting in the respective recess a relatively shallow baking vessel 43 as shown in Fig. 7. In this way, each cooking unit can also serve as a small individual baking oven. As illustrated in Fig. 8, the baking vessel 43 may consist of a bottom section 59 and a top section 60 provided with a removable glass cover plate 61. The bottom section 59 is formed with a horizontal rim 62, while the top section 60 is formed with a depending portion 63 outwardly of rim 62 of bottom section 59 and terminating in an inturned flange 64 disposed beneath the said rim and spaced therefrom. In order to obtain the desired circulation of heated air through the cooking vessel as indicated by the arrows, either the rim 62 or flange 64 may be crimped as at 65 or provided with suitable struck-out portions to maintain the top and bottom sections in spaced relation.

Figure 2:
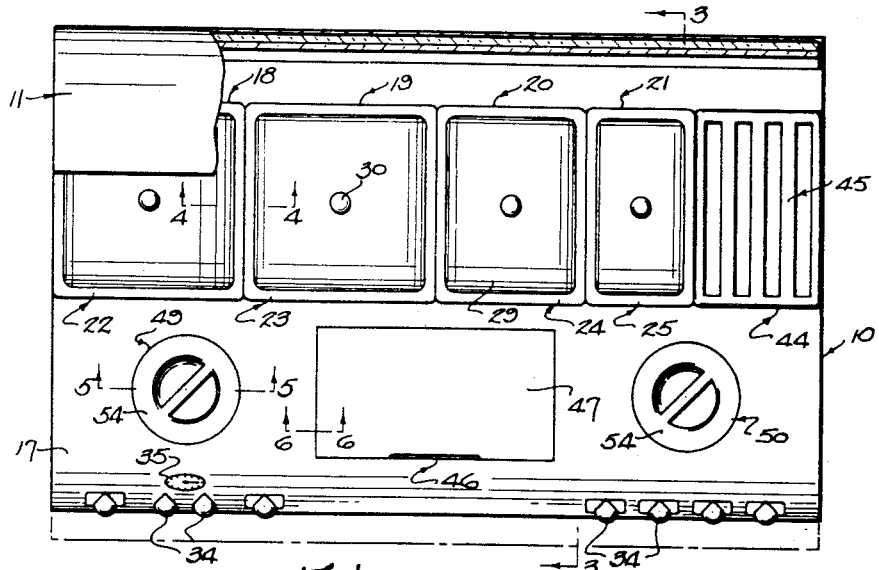
Fig. 2 is a plan view thereof with the cover in open position and partially broken away.
Figure 6:
Fig. 6 is a detail transverse section taken substantially on line 6—6 of Fig. 2.

If desired, the housing 10 may be provided with a further recessed portion 44 in line with recessed portions 22, 23, 24 and 25 and built in said recessed portion 44 and forming a standard part of the stove is a self-contained electric toaster designated generally by the numeral 45 (Fig. 2). The stove may also be provided with a combination sandwich grill and waffle iron of any suitable construction which is built in a recessed portion 46 located forwardly of the cooking vessels. When not in use, the sandwich grill and waffle iron can be concealed by a cover plate 47 supported upon a depressed flange 48 and which cover plate serves as an additional flush work surface.

Figure 5:
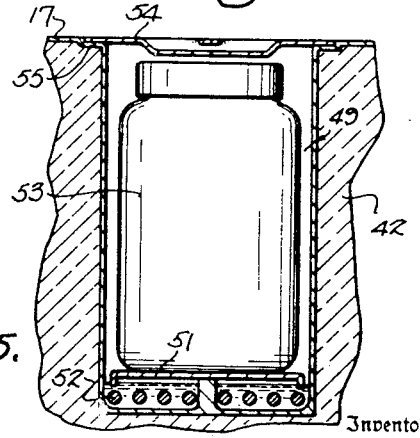
Fig. 5 is a transverse section through one of the warming compartments taken substantially on line 5—5 of Fig. 2.

The top wall 17 of the housing may be further provided with additional recessed portions 49 and 50 at opposite sides of recessed portions 46 and which constitute warming compartments. One of these compartments is shown in section in Fig. 5 and provided in the bottom thereof is a horizontal metal plate 51 beneath which is located a suitable electric resistance 52. The resistance 52 is of the type which is automatically operated by the placing of water within the bottom of the compartment and which will shut off automatically when the water is evaporated. The jar, can, bottle or other container 53 containing the food or liquid to be heated is placed upon the metal plate 51. The upper end of the compartment is preferably provided with a vented cover plate 54 supported upon a flange 55 formed in the top wall of the housing. The warming compartments serve not only as a warmer for precooked foods, soups, etc., but also as a bottle warmer for babies' bottles.

The front wall of the housing may be provided at the juncture of the lower and upper portions 15 and 16 thereof with an opening 56 to facilitate the opening of the cover 11.

Figure 9:
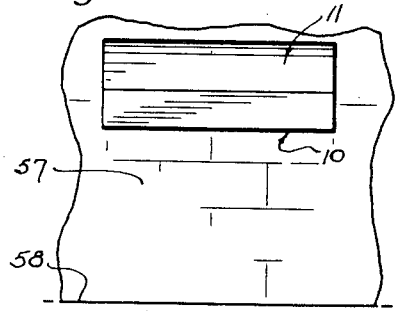
Fig. 9 is a diagrammatic front view showing the cooking stove secured to a wall and the relation thereof with respect to the floor.

The stove herein provided is adapted to be supported by securing it to a wall at a height most comfortable for the housewife so as to minimize stooping or other tiring efforts by the housewife in the cooking processes. Thus, as shown in Fig. 9 by way of example, the stove may be secured to the wall 57 at any desired height above the floor 58. Since no legs are required for supporting the stove, the entire area beneath the said stove is unobstructed.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. A cooking stove of the character described, including a housing having a top wall and a front wall, said front wall being provided with an upwardly and forwardly inclined lower portion and an upwardly and rearwardly inclined upper portion merging into said top wall, and means for performing all of the cooking operations below the surface of the top wall comprising a plurality of cooking recesses therein, cooking vessels adapted to fit within certain of said recesses, heating means within said recesses, a cover for each of said vessels lying substantially flush with the top wall of the housing when said vessels are in the cooking recesses, and a cover for said housing overlying the covers of said cooking vessels when said housing cover is in closed position, and having a forward portion shaped to fit over the inclined upper portion of the front wall of said housing to form a continuation of the inclined lower portion thereof.

2. A cooking stove of the character described, including a housing having a top wall and a front wall, said front wall being provided with an upwardly and forwardly inclined lower portion and an upwardly and rearwardly inclined upper portion merging into said top wall; and means for performing all of the cooking operations below the surface of the top wall comprising a plurality of cooking recesses therein, cooking vessels adapted to fit within certain of said recesses, heating means within said recesses, a cover for each of said vessels lying substantially flush with the top wall of the housing when said vessels are in the cooking recesses; a cover for said housing, said cover having a forward portion shaped to fit over the inclined upper portion of the front wall of the housing and to form a continuation of the inclined lower portion thereof when in closed position, an insulating panel at one point on the under surface of said cover, and a glass plate at another point on the under surface of said cover, a compartment at the rear of the housing into which said housing cover fits when in open position, said insulating panel and said glass plate being so arranged relative to one another on the underside of said cover that when said cover is in open position the insulating panel is concealed within said compartment while said glass plate constitutes a splash panel and when the cover is closed said insulating panel lies directly above the covers on said cooking vessels.

3. A cooking stove of the character described, including a housing projecting horizontally from a wall and unsupported from beneath and having a top wall and a front wall, said front wall being provided with an upwardly and rearwardly inclined upper portion merging into said top wall, and means for performing all of the cooking operations below the surface of the top wall comprising a plurality of cooking recesses therein, cooking vessels adapted to fit within certain of said recesses, heating means within said recesses, a cover for each of said vessels lying substantially flush with the top wall of the housing when said vessels are in the cooking recesses, and a cover for said housing overlying the covers of said cooking vessels when said housing cover is in closed position, and having a forward portion shaped to fit over the inclined upper portion of the front wall of said housing to form a continuation of the inclined lower portion thereof.

HALBERT CRESTON DONER.

REFERENCES CITED

The following references are of record in the file of this patent:

UNITED STATES PATENTS

| Number | Name | Date |
| --- | --- | --- |
| 1,378,566 | Shroyer | May 17, 1921 |
| 1,669,802 | Armstrong | May 15, 1928 |
| 1,800,863 | Johnson | Apr. 14, 1931 |
| 1,820,849 | Teller et al | Aug. 25, 1931 |
| 1,839,128 | Stockstrom et al | Dec. 29, 1931 |
| 2,074,985 | Hofferbert | Mar. 23, 1937 |
| 2,182,682 | Shroyer | Dec. 5, 1939 |
| 2,217,804 | McCormick | Oct. 15, 1940 |
| 2,251,582 | White | Aug. 5, 1941 |
| 2,259,519 | Ershler | Oct. 21, 1941 |
| 2,262,319 | Frazier | Nov. 11, 1941 |
| 2,257,580 | Trompeter | Sept. 30, 1941 |
| 2,266,901 | Parsons | Dec. 23, 1941 |